United States Patent
Sabo

(10) Patent No.: US 11,590,700 B2
(45) Date of Patent: Feb. 28, 2023

(54) THREE-DIMENSIONAL PRINTING SYSTEM WITH PRECISION OPTICAL PATH

(71) Applicant: 3D Systems, Inc., Rock Hill, SC (US)

(72) Inventor: David Sabo, San Diego, CA (US)

(73) Assignee: 3D SYSTEMS, INC., Rock Hill, SC (US)

( * ) Notice: Subject to any disclaimer, the term of this patent is extended or adjusted under 35 U.S.C. 154(b) by 125 days.

(21) Appl. No.: 17/206,314

(22) Filed: Mar. 19, 2021

(65) Prior Publication Data

US 2021/0323230 A1 Oct. 21, 2021

Related U.S. Application Data

(60) Provisional application No. 63/010,990, filed on Apr. 16, 2020.

(51) Int. Cl.

| | |
|---|---|
| *B29C 64/245* | (2017.01) |
| *B33Y 30/00* | (2015.01) |
| *B29C 64/227* | (2017.01) |
| *B29C 64/393* | (2017.01) |
| *B33Y 50/02* | (2015.01) |
| *B29C 64/124* | (2017.01) |
| *B29C 64/255* | (2017.01) |

(52) U.S. Cl.
CPC .......... *B29C 64/245* (2017.08); *B29C 64/227* (2017.08); *B29C 64/393* (2017.08); *B33Y 30/00* (2014.12); *B33Y 50/02* (2014.12); *B29C 64/124* (2017.08); *B29C 64/255* (2017.08)

(58) Field of Classification Search
CPC ... B29C 64/245; B29C 64/255; B29C 64/124; B29C 64/393; B29C 64/227; B33Y 30/00; B33Y 50/02
USPC ................................. 425/162, 375; 264/308
See application file for complete search history.

(56) References Cited

U.S. PATENT DOCUMENTS

| | | | | |
|---|---|---|---|---|
| 2011/0089610 | A1* | 4/2011 | El-Siblani | ............. B29C 64/264 425/89 |
| 2014/0191442 | A1* | 7/2014 | Elsey | ..................... B33Y 30/00 264/401 |
| 2021/0023784 | A1* | 1/2021 | Zitelli | ................... B29C 64/245 |

\* cited by examiner

*Primary Examiner* — Joseph S Del Sole
*Assistant Examiner* — Lawrence D. Hohenbrink, Jr.

(57) ABSTRACT

A three-dimensional printing system for fabricating or manufacturing a three-dimensional article includes a support plate, a resin containment structure, an actuator, a light engine, a support tray coupled to a movement mechanism, and a controller. The resin containment structure is supported by the support plate and includes a lower substructure that is moveably coupled to an upper substructure. The upper substructure defines an upper central opening that is closed by a transparent sheet. The lower substructure defines a lower central opening that is closed by a transparent plate. The actuator is affixed to the support plate and configured to rotate the upper substrate about the hinge between a (1) a raised position in which the transparent plate contacts and supports the transparent sheet and (2) a lowered position in which the transparent plate is out of contact with the transparent sheet.

17 Claims, 5 Drawing Sheets

THREE-DIMENSIONAL PRINTING SYSTEM WITH PRECISION OPTICAL PATH

CROSS-REFERENCE TO RELATED APPLICATIONS

This non-provisional patent application claims priority to U.S. Provisional Application Ser. No. 63/010,990, Entitled "Large Area Three-Dimensional Printing System with Precision Optical Path" by David Sabo, filed on Apr. 16, 2020, incorporated herein by reference under the benefit of U.S.C. 119(e).

FIELD OF THE INVENTION

The present disclosure concerns an apparatus and method for fabrication of solid three dimensional (3D) articles of manufacture from radiation curable (photocurable) resins. More particularly, the present disclosure improves an optical path for a large area stereolithography-based printer.

BACKGROUND

Three dimensional (3D) printers are in rapidly increasing use. One class of 3D printers includes stereolithography printers having a general principle of operation including the selective curing and hardening of radiation curable (photocurable) liquid resins. A typical stereolithography system includes a resin vessel holding the photocurable resin, a movement mechanism coupled to a support tray, and a controllable light engine. The stereolithography system forms a three dimensional (3D) article of manufacture by selectively curing layers of the photocurable resin onto a surface of the support tray. Each selectively cured layer is formed at a "build plane" within the resin.

One variant of this type of system defines a build plane between a lower face of the support tray and a flexible, transparent sheet. One challenge with such a system is to enable the formation of articles having a large lateral area.

SUMMARY

In a first aspect of the disclosure a three-dimensional printing system for fabricating or manufacturing a three-dimensional article includes a support plate, a resin containment structure, an actuator, a light engine, a support tray coupled to a movement mechanism, and a controller. The resin containment structure is supported by the support plate and includes an upper substructure defining an upper central opening, a transparent sheet closing the upper central opening, a lower substructure having a first end and a second end and defining a lower central opening, a transparent plate closing the lower central opening, and a hinge that couples the first end of the lower substructure with the upper substructure. The actuator is affixed to the support plate and configured to rotate the lower substructure about the hinge between a (1) a raised position in which the transparent plate contacts and supports the transparent sheet and (2) a lowered position in which the transparent plate is out of contact with the transparent sheet. The light engine is configured to project radiation up through the transparent plate and the transparent sheet to a build plane above and proximate to the transparent sheet. The controller is configured to operate the movement mechanism, the light engine, and the actuator to fabricate the three-dimensional article in a layer-by-layer manner.

In one implementation the upper substructure includes a frame that clamps an outer periphery of the transparent sheet and a tensioning ring that impinges upon an inner boundary of the transparent sheet. The tensioning ring impinges upon the transparent sheet in a downward direction. The tensioning ring provides a dual function of tensioning the transparent sheet and providing a peripheral surface for laterally containing the resin above the transparent sheet.

In another implementation, the upper substructure includes a lower support ring, a tensioning ring coupled to the lower support ring, and a frame that clamps an outer periphery of the transparent sheet. The tensioning ring can define a recess containing the frame. A plurality of dowels can be pressed into the frame and into the lower support ring to support the frame above the lower support ring.

In another implementation the lower substructure includes a cam follower. The actuator includes a cam that engages the follower. The actuator is configured to rotate the cam to move the follower to selectively raise and lower the second end of the lower substructure.

DETAILED DESCRIPTION OF THE PREFERRED EMBODIMENTS

Figure 1:
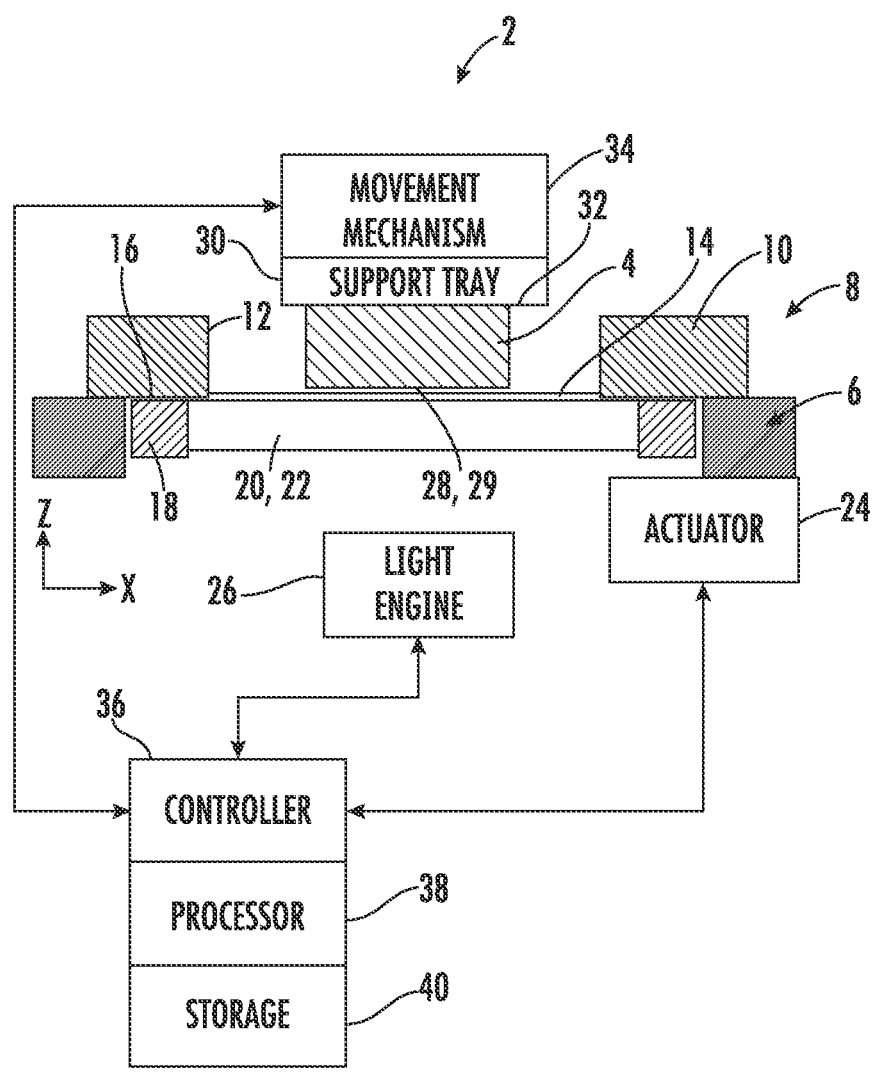
FIG. 1 is a schematic diagram depicting an embodiment of a three-dimensional printing system.

FIG. 1 is a schematic diagram depicting an embodiment of a three-dimensional printing system 2 for fabricating or manufacturing a three-dimensional article 4. In describing system 2, axes X, Y, and Z can be used. Axes X and Y are generally horizontal or lateral and axis Z is generally vertical and generally aligned with a gravitational reference. As discussed herein, the term "generally" refers to having a dimension, an angle, or other parameter that is within manufacturing or placement tolerances.

A support plate 6 supports a resin containment structure 8. Resin containment structure 8 includes an upper substructure 10 defining an upper central opening 12. A transparent sheet 14 is attached to the upper substructure 10 and closes the upper central opening 12.

In one embodiment, the transparent sheet is a flexible polymer sheet having a chemical resistance to photocurable resin while allowing transmission of oxygen as an inhibitor. The transparent sheet is generally transparent to ultraviolet (UV), violet, or blue light. The polymer sheet may include one or more polymers such as polyvinylidene fluoride (PVDF), ethylenchlorotrifluoroethylene (ECTFE), ethylenetetrafluoroethylene (ETFE), polytetrafluoroethylene (PTFE), perfluoroalkoxy (PFA), fluorinated ethylene propylene (FEP), polyvinylidene fluoride (PVDF) or other materials known in the art. The polymer sheet can include amorphous thermoplastic fluoropolymer films such as TEFLON AF 1600™ or TEFLON AF2400™. Other materials are possible.

Attached to a lower surface 16 of the upper substructure 10 is a lower substructure 18. The lower substructure 18 defines a lower central opening 20. A transparent plate 22 is attached to the lower substructure 18 and closes the lower central opening 20. In the illustrated embodiment, the transparent plate 22 provides structural support for the transparent sheet 14.

An actuator 24 is coupled to the support plate 6. Actuator 24 is configured to position the lower substructure 18 with respect to the upper substructure 10 including (1) an raised position at which the transparent plate 22 contacts and supports the transparent sheet 14 and (2) a lower position at which the transparent plate 22 is out of contact from the transparent sheet 14.

A light engine 26 is positioned below the transparent plate 22. The light engine 26 is configured to project radiation up through the transparent plate 22, through the transparent sheet 14 and over a build plane 28 that is proximate to but separated from the transparent sheet 22. A lower face 29 of the three-dimensional article 4 can be positioned proximate to (or one slice thickness above) the build plane 28.

A support tray 30 has a lower surface 32 for supporting the three-dimensional article 4. A movement mechanism 34 is coupled to the support tray 34. The movement mechanism 34 is for controllably and vertically positioning the support tray 30.

In an illustrative embodiment, the movement mechanism 34 is a motorized device for vertically positioning the support tray 30 and outputting an encoder signal that is indicative of a vertical position of the support tray 30. In an illustrative embodiment, the movement mechanism 34 includes a vertically fixed portion and a vertically moving portion. The vertically moving portion supports the build tray and includes a threaded bearing. The vertically fixed portion includes a motor coupled to a lead screw which is received within the threaded bearing. As the motor rotates the lead screw, the action upon the threaded bearing translates the build tray up or down, depending upon the rotational direction of the lead screw.

A controller 36 is electrically and/or wirelessly coupled to the actuator 24, the light engine 26, and the movement mechanism 34. The controller 36 includes a processor 38 coupled to an information storage device 40. The information storage device 40 stores software instructions. When executed by the processor, the software instructions control the actuator 24, the light engine 26, the movement mechanism 34, and other portions of system 2. Thus, the controller is configured to control the actuator 24, the light engine 26, the movement mechanism 34, and other portions of system 2.

Figure 2:
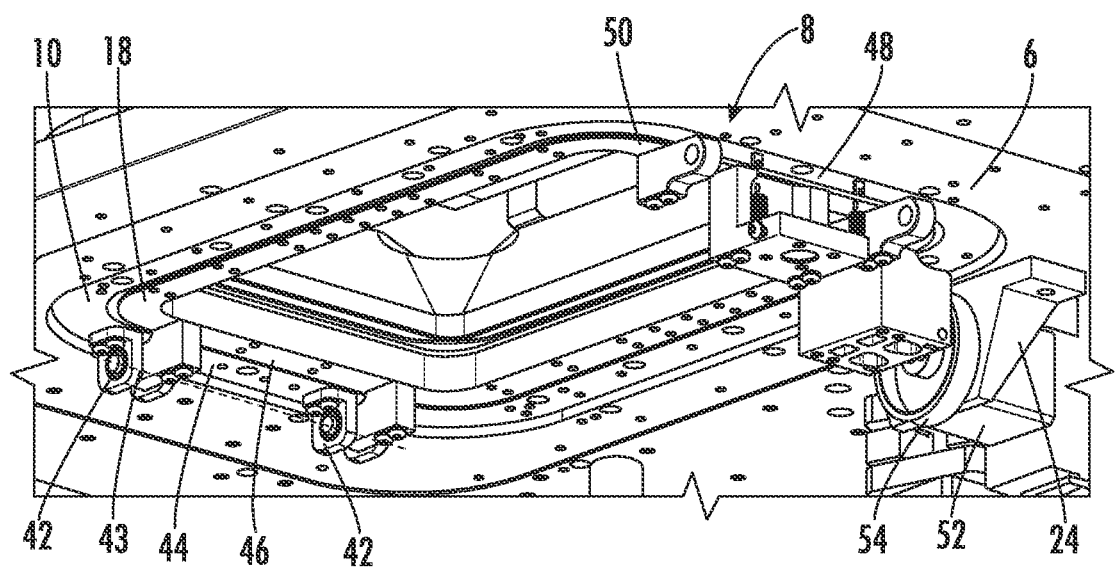
FIG. 2 is an isometric view (looking upward and laterally) of a portion of a three-dimensional printing system including a support plate, a resin containment structure, and an actuator.
Figure 2A:
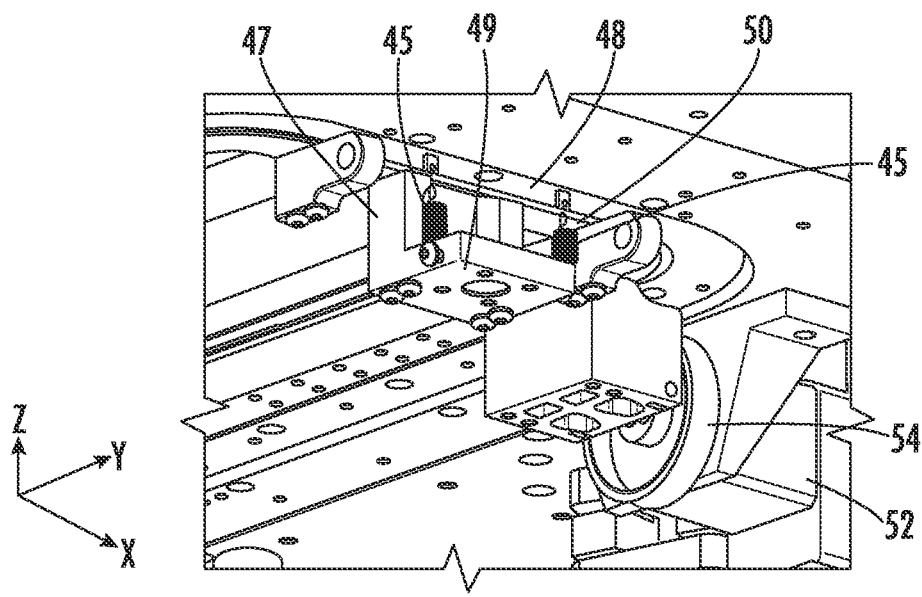
FIG. 2A is detail taken from FIG. 2.
Figure 3:
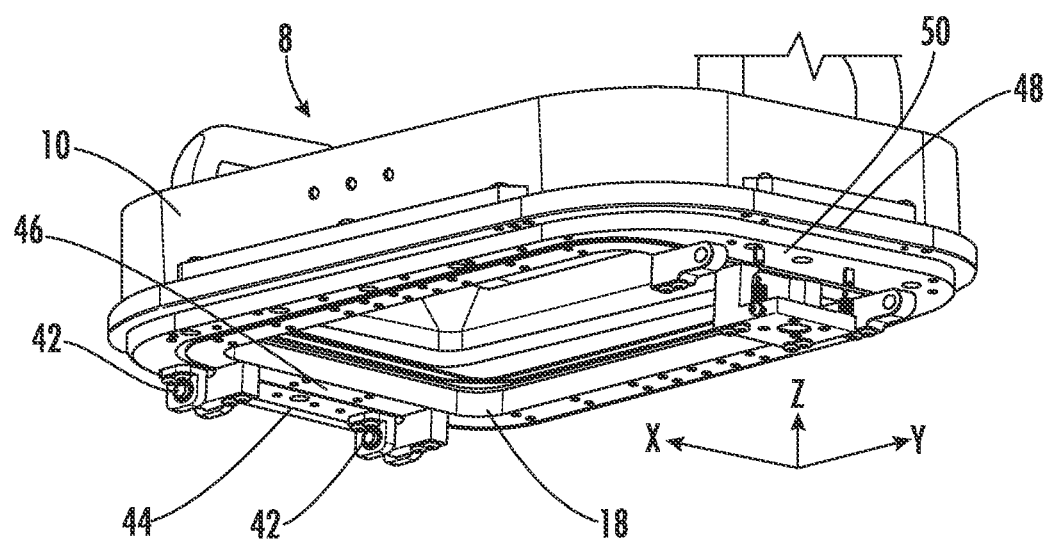
FIG. 3 is an isometric view of a resin containment structure in isolation.

FIG. 2 is an isometric lower view of a portion of system 2 including the support plate 6, resin containment structure 8, and the actuator 24. FIG. 2A is detail taken from FIG. 2. FIG. 3 is an isometric view of the resin containment structure 8 in isolation. The support plate 6 laterally surrounds and supports the upper substructure 10 of the containment structure 8. A hinge 42 (two hinges 42) rotatively couple the lower substructure 18 to the upper substructure 10. The hinge 42 has an axis of rotation 43 that is parallel to the lateral X-axis. The lower substructure 18 is lowered with respect to the upper substructure 10 when it is rotated about the hinge 42 axis 43 in a downward direction to an oblique lower position (oblique angle) with respect to the Y and Z axes. The hinge 42 is coupled to a first end 44 of the upper substructure 10 and to a first end 46 of the lower substructure 18. The actuator 24 is configured to raise and lower a second end 50 of the lower substructure 18 with respect to a second end 48 of the upper substructure 10.

A spring 45 (two springs 45) couple the second end 50 of the lower substructure to the second end 48 of the upper substructure 10. The spring 45 urges the second end 50 in an upward direction and thus the transparent support 22 into supporting contact with the transparent sheet 14. An L-shaped block 47 is coupled to the second end 50 and has an overhang 49 that overhangs the second end 48. The spring 45 extends between the overhang 49 of the L-shaped block 47 and the second end 48.

Figure 4:
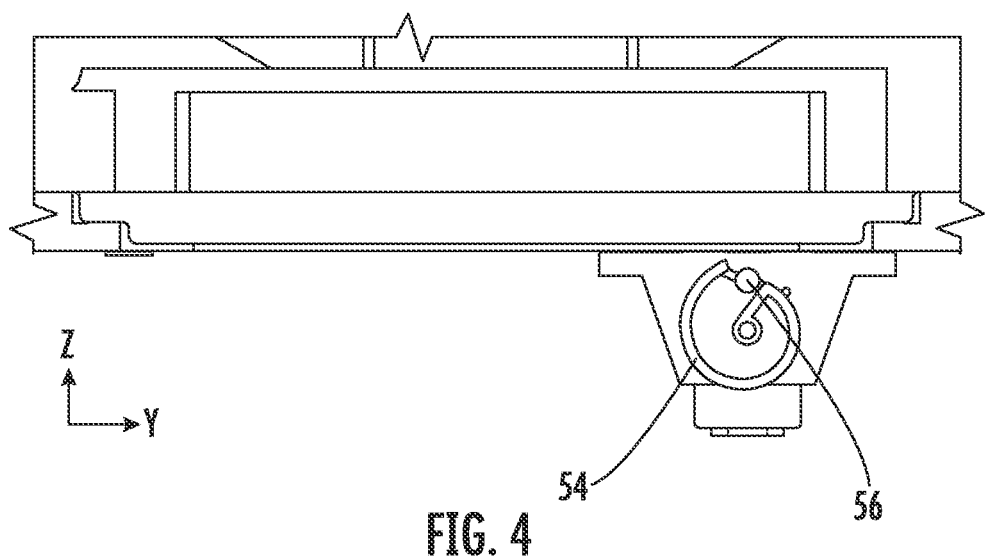
FIG. 4 is a side view of a portion of a three-dimensional printing system with emphasis on the interaction between a rotation-driven cam and a cam follower.

In the illustrated embodiment, the actuator 24 includes a motor 52 coupled to a cam 54. As illustrated in FIG. 4, the lower substructure 18 includes a cam follower 56 that is engaged by the cam 54. Rotation of the cam 54 between a first (raised) position and a second (lowered) position results in the raising and lowering of the second end 50 of the lower substructure 18 between a corresponding first (raised) and a second (lowered) position with respect to the second end 48 of the upper substructure 10.

Figure 5A:
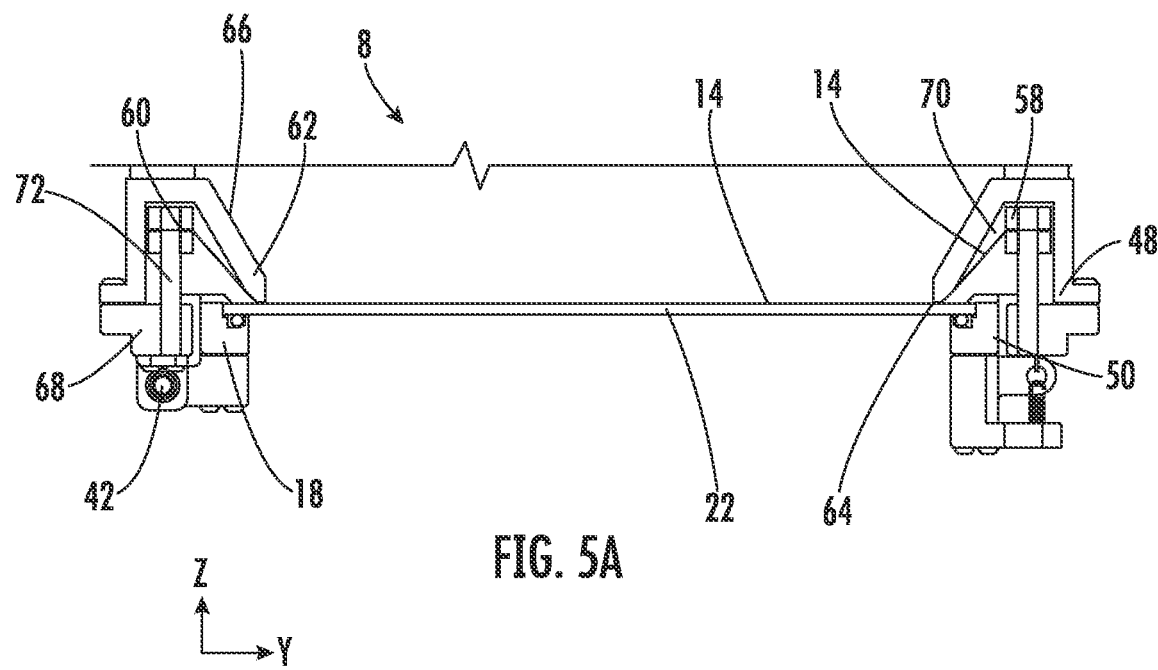
FIG. 5A is a cutaway view of a resin containment structure taken in a vertical YZ-plane to illustrate a raised (5A) position of a lower substructure.
Figure 5B:
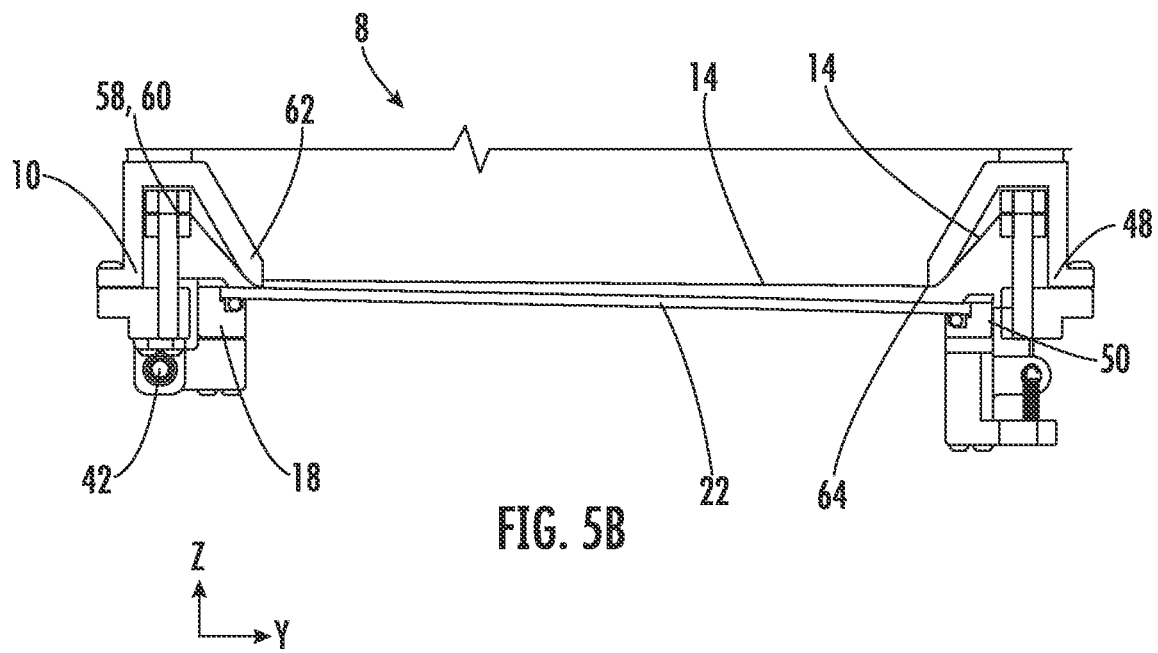
FIG. 5B is a cutaway view of a resin containment structure taken in a vertical YZ-plane to illustrate a lowered (5B) position of a lower substructure.

FIGS. 5A and 5B are cutaway views of the resin containment structure 8 taken in the YZ-plane to illustrate the raised position (5A) and lowered position (5B) of the lower substructure 18. In the raised (5A) position, the transparent plate 22 is supporting the transparent sheet 14 to prevent bowing in the vertical Z direction. In the lowered (5B) position, the transparent plate 22 is separated from the transparent sheet 14. In the lowered (5B) position, the transparent sheet 14 is parallel to the lateral X and Y axes and the XY plane (except perhaps for a downward bow), whereas the transparent plate 22 defines an oblique angle with respect to the lateral Y-axis and the vertical Z-axis or is curved.

The transparent plate 22 can be formed from a transparent rigid inorganic material such as glass or quartz. Alternatively, the transparent plate 22 can be formed from an organic or polymer material such as acrylic. Use of a flexible acrylic has an advantage that it flexes as it is lowered between the raised (5A) and lowered (5B) position. The flexing initiates a peeling action between the transparent sheet 14 and the transparent plate 22, which reduces a force of separation between the transparent sheet 14 and the transparent plate 22.

In the illustrated embodiment, the upper substructure 10 includes frame 58 that supports and clamps an outer periphery 60 of the transparent sheet 14. Upper substructure 10 includes a tensioning ring 62 that impinges downward upon an inner boundary 64 of the transparent sheet 14. The effect of the tensioning ring 62 is to provide a certain degree of tension and planarity of the transparent sheet 14. Resin is contained by an inner and upper surface 66 defined by the tension ring 62 and the transparent sheet 14. Thus, the tension ring 62 provides a dual function of tensioning the transparent sheet 14 and laterally containing the resin above the transparent sheet 14.

In the illustrated embodiment, the upper substructure 10 includes the tension ring 62 coupled to a lower support ring 68. The tension ring 62 defines a downward facing recess 70 that contains the frame 58. A plurality of dowel pins 72 are pressed into the frame 58 and the lower support ring 68 to support the frame 58 above the support ring 68.

Figure 6:
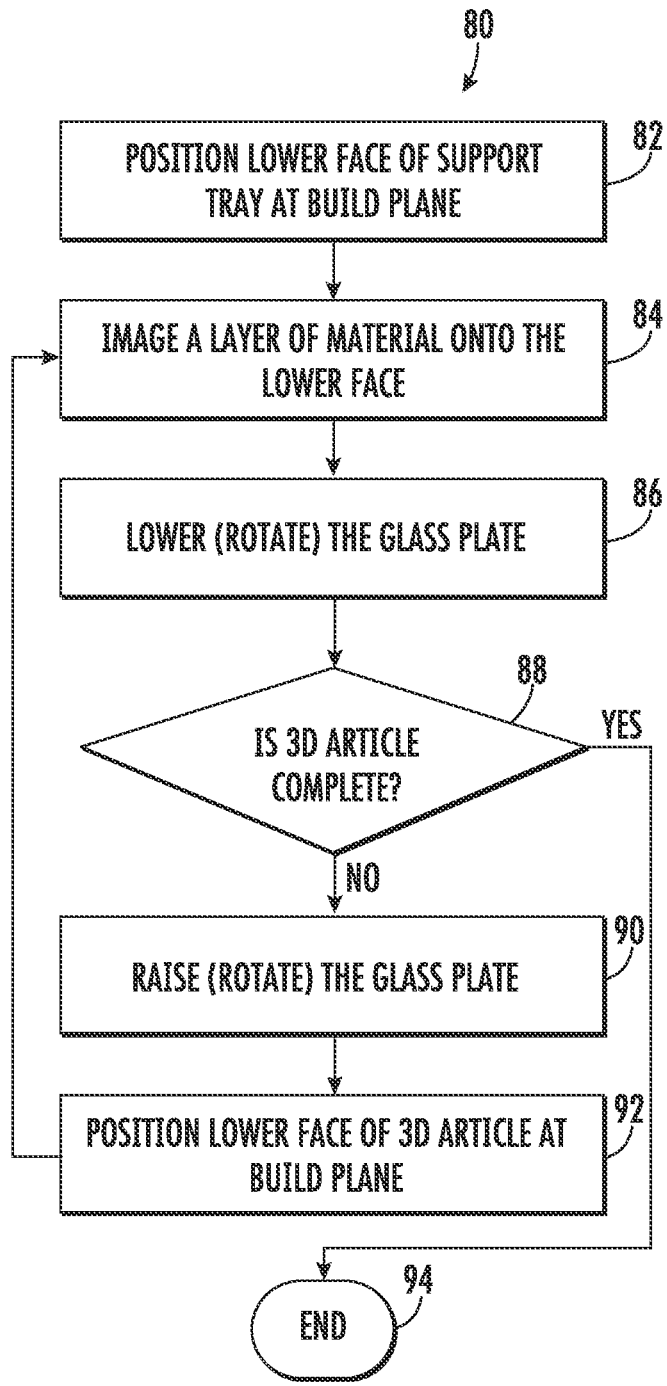
FIG. 6 is a flowchart depicting a method of fabricating or manufacturing a three-dimensional article.

FIG. 6 is a flowchart depicting a method 80 of fabricating or manufacturing a three-dimensional article 4. Controller 36 is configured to operate the actuator 24, light engine 26, movement mechanism 34, and other portions of system 2 to perform the method 80. Initially the lower substructure 18 is in the raised (5A) position and the transparent plate 22 is supporting the transparent sheet 14.

According to 82, the movement mechanism 34 is operated to position the lower surface or face 32 of support tray 30 at the build plane 28. According to 84, the light engine 26 is operated to selectively apply radiation to the build plane 28 and to selectively solidify a layer of resin onto the lower face 32 (or 29, once the three-dimensional article 4 is partially formed). According to 86, the actuator 24 is operated to rotate the lower substructure 18 from the raised (5A) position to the lowered (5B) position. The rotation during step 86 is about the hinge 42 and the second end 50 of the lower substructure 18 moves downward (−Z) with respect to the second end 48 of the upper substructure.

According to 88, if the three-dimensional article 4 is not fully fabricated, then the actuator 24 is operated to rotate the lower substructure 18 from the lowered (5B) position to the raised (5A) position according to step 90. The rotation during step 90 is about the hinge 42 and the second end 50 of the lower substructure 18 moves upward (+Z) with respect to the second end 48 of the upper substructure. According to step 92, the lower face 29 is positioned proximate to the build plane 28. The process then loops back to step 84.

If, at step 88, the three-dimensional article 4 is fully fabricated, then the process ends according to 94. Method 80 is somewhat simplified and may leave out certain details. For example, as part of step 94, the movement mechanism 34 can be operated to raise the three-dimensional article above resin in the resin containment structure 8.

The order of operations in FIG. 6 can vary. In one alternative embodiment, step 90 can occur after step 92. In another alternative embodiment steps 90 and 92 can occur concurrently.

The specific embodiments and applications thereof described above are for illustrative purposes only and do not preclude modifications and variations encompassed by the scope of the following claims.

What is claimed:

1. A three-dimensional printing system for fabricating a three-dimensional article comprising:
    a resin containment structure including:
        an upper substructure configured to contain resin and defining an upper central opening;
        a transparent sheet attached to the upper substructure and closing the upper central opening;
        a lower substructure having a first end and a second end and defining a lower central opening;
        a transparent plate closing the lower central opening;
        a hinge that couples the first end of the lower substructure with the upper substructure;
    an actuator configured to rotate the lower substructure about the hinge between a (1) a raised position in which the transparent plate contacts and supports the transparent sheet and (2) a lowered position in which the transparent plate is out of contact with the transparent sheet; and
    a light engine configured to project radiation up through the transparent plate and the transparent sheet to a build plane above and proximate to the transparent sheet;
    wherein the upper substructure includes:
        a frame that clamps an outer periphery of the transparent sheet; and
        a tensioning ring that impinges upon an inner boundary of the transparent sheet.

2. The three-dimensional printing system of claim 1 wherein the tensioning ring impinges upon the transparent sheet in a downward direction.

3. The three-dimensional printing system of claim 1 wherein the tensioning ring provides a dual function of tensioning the transparent sheet and providing a peripheral surface for laterally containing the resin above the transparent sheet.

4. The three-dimensional printing system of claim 1 wherein the tensioning ring defines a recess containing the frame.

5. The three-dimensional printing system of claim 1 wherein the upper substructure includes a lower support ring, the tensioning ring is coupled to the lower support ring.

6. The three-dimensional printing system of claim 5 further comprising a plurality of dowels pressed into the lower support ring and the frame to support the frame above the lower support ring.

7. The three-dimensional printing system of claim 1 wherein the lower substructure includes a cam follower, the actuator includes a cam that engages the follower, the actuator is configured to rotate the cam to move the follower to selectively raise and lower the second end of the lower substructure.

8. The three-dimensional printing system of claim 1 further comprising a support plate that supports the upper substructure, the actuator is mounted to the support plate.

9. The three-dimensional printing system of claim 1 further comprising:
    a support tray;
    a movement mechanism coupled to the support tray; and
    a controller configured to operate the actuator, the light engine, and the movement mechanism.

10. The three-dimensional printing system of claim 9 wherein the controller is configured to:
    (1) operate the movement mechanism to position a lower face of either the support tray or the three-dimensional article at the build plane;
    (2) operate the light engine to selectively image and harden a layer of resin onto the lower face;
    (3) operate the actuator to rotatively lower the glass plate;
    (4) operate the actuator to rotatively raise the glass plate; and
    (5) repeat operation of the movement mechanism, the light engine, and the actuator to complete fabrication of the three-dimensional article.

11. A three-dimensional printing system for fabricating a three-dimensional article comprising:
    a support plate;
    a resin containment structure supported by the support plate including:
        an upper substructure defining an upper central opening;
        a transparent sheet attached to the upper substructure and closing the upper central opening;
        a lower substructure having a first end and a second end and defining a lower central opening;
        a transparent plate closing the lower central opening; and
        a hinge that couples the first end of the lower substructure with the upper substructure;

an actuator affixed to the support plate and configured for rotatively raising and lowering the second end of the lower substructure with respect to the upper substructure;

a light engine configured to project radiation up through the transparent plate and the transparent sheet to a build plane above and proximate to the transparent sheet;

a support tray;

a movement mechanism coupled to the support tray; and a controller configured to operate the movement mechanism, the light engine, and the actuator to fabricate the three-dimensional article in a layer-by-layer manner;

wherein the upper substructure includes:
   a frame that clamps an outer periphery of the transparent sheet; and
   a tensioning ring that impinges upon an inner boundary of the transparent sheet.

12. The three-dimensional printing system of claim 11 wherein the tensioning ring impinges upon the transparent sheet in a downward direction.

13. The three-dimensional printing system of claim 11 wherein the tensioning ring provides a dual function of tensioning the transparent sheet and providing a peripheral surface for laterally containing the resin above the transparent sheet.

14. The three-dimensional printing system of claim 11 wherein the upper substructure includes a lower support ring, the tensioning ring is coupled to the lower support ring.

15. The three-dimensional printing system of claim 14 wherein the tensioning ring defines a recess containing the frame.

16. The three-dimensional printing system of claim 15 further comprising a plurality of dowels pressed into the lower support ring and the frame to support the frame above the lower support ring.

17. The three-dimensional printing system of claim 11 wherein the lower substructure includes a cam follower, the actuator includes a cam surface that engages the follower, the actuator is configured to rotate the cam surface to raise and lower the second end of the lower substructure.

\* \* \* \* \*